3,154,436
REWETTABLE BATTERY SEPARATOR
Paul B. Tomaino, Needham, Mass., assignor to W. R. Grace & Co., Cambridge, Mass., a corporation of Connecticut
No Drawing. Filed Apr. 4, 1961, Ser. No. 100,487
4 Claims. (Cl. 136—146)

This invention relates to means for rendering plate separators for electric storage batteries permanently rewettable and to separators having an enhanced permanent rewettability.

Plate separators are customarily used between the plates in both acid and alkaline storage battery cells. The function of the separator is to prevent physical contact between the respective positive and negative plates of the cells while at the same time permitting essentially free circulation of the electrolytes through the storage battery. Since the active materials on the plates in storage battery cells possess a degree of mobility during the charge and discharge cycles of the battery, the passages through the separators must be very small indeed to prevent the intrusion of the active paste material into the separator. Such intrusions eventually cause a short circuit between the adjoining opposite plates separated by the separator. However, the minute passages through the separators must afford a free and practically unimpeded passage for the electrolyte and for the ions in the electrolyte if the battery is to work at full efficiency.

Over the years battery separators have been made from a variety of materials. Most popular have been thin sections of certain woods, notably Port Orford cedar, and microporous sheets formed from rubber, synthetic rubber, or a variety of plastic materials such as polyvinyl chloride or polyethylene. In recent years, most batteries especially batteries designed for the automotive market, have been made using separators formed by impregnating and coating the fibers in a porous cellulosic web with a chemically resistant thermosetting resin. Such separators are normally formed using as a base a paper made from a purified wood pulp or from certain other naturally occurring cellulose fibers notably cotton linters and using as an impregnant a water or alcohol soluble, phenol formaldehyde. Since, after the resin has been advanced to the infusible stage the surface of the resin impregnated and coated fiber becomes essentially hydrophobic in character, it has been customary to treat the separator with a wetting agent in order to enhance the wetting of the fibers by the electrolyte and therefore the passage of the electrolyte through the minute passages in the separator. The wetting agent has been incorporated in the impregnant solution in some instances and has been added to the finished or semi-finished separator in other instances. There are, of course, some rather stringent limitations to the type of wetting agents that can be used. Primarily these requirements include the fact that the wetting agent should be acid or alkali resistant as the case may be, should not be of such a nature that it might release material foreign to the electrochemical reaction in the battery and should not cause excessive shedding of the paste materials of the plates of the cell. Details of the requirements for and the method of manufacture of battery separators of the resin impregnated cellulosic fiber type are presented in a number of previously issued patents and will not be repeated here.

In recent years the dry charge battery has come into vogue. In such batteries the cell groups are assembled, charged (or formed), washed in water to eliminate the electrolyte, dried, and assembled into storage batteries. To activate such a battery it is merely necessary to introduce into each of the cells the proper electrolyte solution. Dry charge batteries have become quite popular primarily because they are easier to ship and to store. Unlike a wet charge battery, a dry charge battery is not subject to self-discharge as long as the cells remain truly dry and for this reason is it not necessary to maintain such batteries on a trickle charge in order that they will be at full strength when finally installed in, for example, a vehicle.

Ideally, in the manufacture of a dry charge battery, the assembled cell group should remain assembled throughout the entire operation. The alternative method, which involves assembling a cell group with positive and negative plates and intervening plate separators, forming the assembled cell group, disassembling the cell group, washing and drying the positive and negative plates separately, and finally reassembling the charged dry plates with fresh separators is too expensive to be attractive.

When assembled cell groups are handled as a unit, the requirements imposed on the wetting agent in the separator are very stringent indeed. In this instance, the cell groups are assembled, immersed in electrolyte, formed, washed free of all electrolyte, dried completely, and assembled into storage batteries. The dry charged battery should, upon reactivation by the addition of fresh electrolyte, deliver substantial amounts of current within a very short period, normally less than 20 seconds. To accomplish this, the wetting agent in the separator should still be effective at the time of activation even though this wetting agent has previously been subjected to the action of the electrolyte during the forming step, prolonged washing with fresh water during the washing step, and to a relatively high degree of heat during the drying step. In order to insure that a sufficient amount of wetting agent is present in the separators at the time of activation to permit rapid activation, the introduction of additional wetting agent into the assembled cell group as the final step in the washing process has often times been resorted to in the past. Since this additional wetting agent is introduced into the separator and into the negative and positive plates as well, the plates are subjected to the full concentration of the additional wetting agent. This additional wetting agent may act as a dispersing agent for the material in the paste on the plates and thereby contribute to the premature failure of the battery due to excessive shedding of the paste.

A number of wetting agents have been discovered which will perform satisfactorily in dry charged batteries under normal circumstances, even in the absence of the further addition of wetting agent during the washing step. Such wetting agents include, for example, the alkyl esters of sulfosuccinic acid and condensates of ethylene oxide with a hydrophobic base formed by condensing propylene oxide with propylene glycol.

While these materials are used successfully in most instances, not all dry charged batteries activate satisfactorily. The variability in result is believed to be due to the fact that there is a variability in the hydrophobic nature of the surface of the impregnated fibers, coupled with the fact that both of these wetting agents are to a large degree water soluble and for this reason substantial quantities of wetting agent are lost in the washing step. It would appear from the results in practice that the residual wetting effect is marginal and while satisfactory for the average fibrous surface, is insufficient in those instances where the surface of the fiber is more hydrophobic than normal.

Since it is desirable to have dry charged batteries which will activate in every instance, and since the cause of variability in the wettability is unknown and, therefore, uncontrollable, it is desirable to provide battery separators with a wetting agent which will retain its full efficiency even under the most adverse circumstances.

Such a material should have a high degree of surface activity in terms of its ability to reduce the contact angle between the electrolyte and the surface of the resin impregnated fibers, and should, in the form that exists in the battery separator, possess little or no solubility in the electrolyte or in water.

I have discovered that certain triol polyethers formed by reacting propylene oxide with hexane triol and having a molecular weight between 700 and 4000 and preferably about 2500 do meet these requirements admirably. Suitable propylene oxide adducts of hexane triol are obtainable from Union Carbide Chemicals Company under the designation "Niax" Triol LHT–42, "Niax" Triol LHT–67, "Niax" Triol LHT–112, and "Niax" Triol LHT–240. "Niax" Triol LHT–42 has a molecular weight of 4000 and a hydroxyl number of 42 as determined by a procedure set forth in Union Carbide Chemicals Company Bulletin F–40378, issued September 1958. "Niax" Triol LHT–67 has a molecular weight of 2500 and a hydroxyl number of 112. "Niax" Triol LHT–240 has a molecular weight of 700 and a hydroxyl number of 240.

The preferred material is the propylene oxide adduct of hexane triol having a molecular weight of 2500 and a hydroxyl number of 67.

These materials are substantially completely water insoluble and are not normally considered to be surface active agents. For example, they are not included in the rather complete catalogue of surface active agents published under the title of "Surfactants Listed" by John W. McCutcheon, John W. McCutcheon, Inc., New York 17, New York, 1958. The principle normal use appears to be as polyether adducts for polyurethane reactions.

While the propylene oxide adduct of hexane triol may be added to the separator at any stage of its manufacture, I prefer to mix it with the solution of impregnating resin before impregnation. There is reason to believe that during the curing reaction of the impregnant these alkylene oxide condensates on a trihydroxy alkane backbone, react via their hydroxy end groups with the phenolic resin in the resole stage either by forming ether linkages with methlol phenol groups or directly with the ring to provide a chemically intimate hydrophilic grouping within the essentially hydrophobic phenolic resin matrix. In any event, however, the addition of the propylene oxide adduct of hexane triol renders the resin impregnated cellulosic fibers permanently wettable by electrolyte and this wettability is not reduced by prolonged contact with concentrated acid or alkali electrolyte solutions or by prolonged washing. I prefer to incorporate between about one half and about five percent of the propylene oxide adduct of hexane triol by weight based on the resin in the impregnating sodium. Normally, between one half and two percent and preferably about one percent is quite satisfactory.

As mentioned above, the propylene oxide adduct of hexane triol having a molecular weight between 700 and 4000 is not soluble in water. This adduct, however, is soluble in the lower alcohols and certain ketones. Thus it may be added directly to the alcohol solutions of phenol formaldehyde resins which are sometimes used in impregnating fibrous webs for use as battery separators.

Because of its water insolubility, the propylene oxide adduct of hexane triol cannot be added directly to the water solutions of such resins. Such solutions are most commonly used as impregnants because of their convenience and low cost. I have found that if the propylene oxide adduct of hexane triol was dissolved in an organic solvent such as a lower alcohol, for example methanol, ethanol, or isopropanol or a lower ketone such as methylethyl ketone or acetone, and the solution emulsified in a water solution of phenol formaldehyde resin, the propylene oxide adduct separated out of the resin solution forming an oily layer. I then tried a large number of conventional water-soluble, surface-active agents as emulsifiers for the solution of the propylene oxide adduct of hexane triol. A number of these formed stable emulsions with the adduct but upon addition to the water solution of resin, the emulsion broke and the adduct separated out as a separate layer.

I have found that a stable solution of the propylene oxide adduct of hexane triol, which solution itself is water soluble, can be formed by mixing with one part by weight of the adduct at least about three-fourths part by weight of an alkyl ester of sulfosuccinic acid, preferably the octyl ester. This solution can be added directly to the resin solution and forms a stable mixture therein.

I prefer to reduce the viscosity of this solution by adding a water soluble solvent for the adduct, such as 50 percent methanol, although I may also use for this purpose such other water soluble solvents as isopropanol, methylethyl ketone or acetone. The solution I prefer to use consists of one part of the propylene oxide adduct of hexane triol, one part of the alkyl ester of sulfosuccinic acid and one part of 50 percent methanol. Although the order of mixing is not important, I prefer to mix the alkyl ester of sulfosuccinic acid and the solvent first and then to add the propylene oxide adduct of hexane triol. The solvent is not required and merely reduces the viscosity of the solution. The mixture of alkyl sulfosuccinic acid and the propylene oxide adduct of hexane triol, without any solvent, is water soluble and, in fact, has a lower viscosity than either of the two components.

To compare the effectiveness of this new wetting system with a conventional wetting system, the following series of comparative experiments were performed. Both a wood pulp paper and a cotton linter paper were impregnated with the following impregnating solutions in which all parts are by weight:

| Ingredients | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| A water solution of phenol formaldehyde resin approximately 50% solids | 100 | 100 | 100 | 100 | 100 | 100 | 100 | 100 | 100 | 100 | 100 | 100 | 100 | 100 |
| Octyl ester of sulfosuccinic acid | 0.5 | 1 | 2 | 0.15 | 0.15 | 0.2 | 0.187 | 0.25 | 0.375 | 0.5 | 0.75 | 1.0 | 1.5 | 2.0 |
| Propylene oxide adduct of hexane triol 2500 molecular weight | | | | 0.15 | 0.2 | 0.2 | 0.25 | 0.25 | 0.5 | 0.5 | 1.0 | 1.0 | 2.0 | 2.0 |
| Anhydrous methanol | 0.25 | 0.5 | 1 | 0.075 | 0.1 | 0.1 | 0.125 | 0.125 | 0.25 | 0.25 | 0.5 | 0.5 | 1.0 | 1.0 |
| Water | 0.25 | 0.5 | 1 | 0.075 | 0.1 | 0.1 | 0.125 | 0.125 | 0.25 | 0.25 | 0.5 | 0.5 | 1.0 | 1.0 |
| Do | 71 | 71 | 71 | 71 | 71 | 71 | 71 | 71 | 71 | 71 | 71 | 71 | 71 | 71 |

The resin in each case was cured by heating the impregnated paper to a temperature of 205° C. for a period of 4 minutes. In each case the time to wet the separator through in 1.250 specific gravity sulfuric acid was measured. The samples were then soaked in 1.100 specific gravity sulfuric acid at 43° C. for 48 hours to simulate the formation step and were then washed thoroughly and dried. The wetting time was measured again. In this instance, if the wetting was incomplete after a period of 180 seconds, the percentage area of the sheet that was wet was determined. The wetting times given are in each case the averages of four results. The results were:

weight of approximately 2500 and a hydroxyl number of approximately 67.

|  | 1 | 2 | 3 | 4 | 5 | 6 | 7 |
|---|---|---|---|---|---|---|---|
| Wood Pulp Paper: | | | | | | | |
| Initial Wetting Time. | 10 seconds | 1 second | 1 second | 3 seconds | 2 seconds | 2 seconds | 1 second. |
| Second Wetting Time. | 80% of area wet after 180 seconds. | 90% of area wet after 180 seconds. | Almost completely wet after 180 seconds. | 16% of area wet after 180 seconds. | 90% of area wet after 180 seconds. | 90% of area wet after 180 seconds. | 105 seconds. |
| Cotton Linter Paper: | | | | | | | |
| Initial Wetting Time. | 125 seconds | 5 seconds | 1 second | 2 seconds | 1 second | 1 second | Instantaneous. |
| Second Wetting Time. | 50% of area wet after 180 seconds. | 65% of area wet after 180 seconds. | 80% of area wet after 180 seconds. | 5% of area wet after 180 seconds. | 70% of area wet after 180 seconds. | 70% of area wet after 180 seconds. | 91% of area wet after 180 seconds. |

|  | 8 | 9 | 10 | 11 | 12 | 13 | 14 |
|---|---|---|---|---|---|---|---|
| Wood Pulp Paper: | | | | | | | |
| Initial Wetting Time. | 1 second | Instantaneous | Instantaneous | Instantaneous | Instantaneous | Instantaneous | Instantaneous. |
| Second Wetting Time. | 105 seconds | 35 seconds | 35 seconds | 20 seconds | 20 seconds | 15 seconds | 15 seconds. |
| Cotton Linter Paper: | | | | | | | |
| Initial Wetting Time. | Instantaneous | Instantaneous | Instantaneous | Instantaneous | Instantaneous | Instantaneous | Instantaneous. |
| Second Wetting Time. | 91% of area wet after 180 seconds. | 30 seconds | 30 seconds | 35 seconds | 35 seconds | 15 seconds | 15 seconds. |

This application is a continuation-in-part of my co-pending application Serial No. 23,646, filed April 21, 1960, now abandoned.

I claim:

1. A phenol formaldehyde resin impregnated fibrous plate separator for secondary electric cells that has been rendered permanently rewettable by the presence of between about one half and about five percent by weight based on the weight of the resin of a propylene oxide adduct of hexane triol, said adduct having a molecular weight between 700 and 4000 and a hydroxyl number between 42 and 240.

2. The plate separator claimed in claim 1 wherein the propylene oxide adduct of hexane triol has a molecular weight of approximately 2500 and a hydroxyl number of approximately 67.

3. The plate separator claimed in claim 1 wherein at least three-fourths part by weight of an alkyl ester of sulfosuccinic acid is used in conjunction with one part by weight of said adduct.

4. The plate separator claimed in claim 3 wherein the ester is the octyl ester of sulfosuccinic acid.

References Cited in the file of this patent

UNITED STATES PATENTS

| 2,556,902 | Chambers et al. | June 12, 1951 |
| 2,613,192 | Honig | Oct. 7, 1952 |
| 2,953,622 | Gray | Sept. 20, 1960 |
| 2,970,181 | Corran | Jan. 31, 1961 |